US010438028B2

(12) United States Patent
Wolffle

(10) Patent No.: US 10,438,028 B2
(45) Date of Patent: Oct. 8, 2019

(54) SWITCH SPRING ARRANGEMENT

(71) Applicant: Amphenol-Tuchel Electronics GmbH, Heilbronn (DE)

(72) Inventor: Pascal Wolffle, Nordheim (DE)

(73) Assignee: Amphenol-Tuchel Electronics GmbH, Heilbronn (DE)

( * ) Notice: Subject to any disclaimer, the term of this patent is extended or adjusted under 35 U.S.C. 154(b) by 0 days.

(21) Appl. No.: 16/098,907

(22) PCT Filed: Apr. 28, 2017

(86) PCT No.: PCT/EP2017/060257
§ 371 (c)(1),
(2) Date: Nov. 5, 2018

(87) PCT Pub. No.: WO2017/191060
PCT Pub. Date: Nov. 9, 2017

(65) Prior Publication Data
US 2019/0147200 A1 May 16, 2019

(30) Foreign Application Priority Data
May 4, 2016 (DE) .................... 10 2016 108 319

(51) Int. Cl.
*H01R 24/00* (2011.01)
*G06K 7/00* (2006.01)
*H01H 1/14* (2006.01)
*H01H 27/00* (2006.01)
*H01R 12/70* (2011.01)
*H01R 13/24* (2006.01)
*H01R 13/703* (2006.01)

(52) U.S. Cl.
CPC ......... *G06K 7/0021* (2013.01); *G06K 7/0056* (2013.01); *G06K 7/0069* (2013.01); *H01H 1/14* (2013.01); *H01H 27/00* (2013.01); *H01R 12/7094* (2013.01); *H01R 13/2442* (2013.01); *H01R 13/703* (2013.01); *H01R 13/7033* (2013.01)

(58) Field of Classification Search
CPC ...... G06K 7/0021; G06K 7/00; G06K 7/0047; G06K 7/0056; H01R 13/703; H01R 12/7094; H01R 13/7033
USPC .......................................... 439/629
See application file for complete search history.

(56) References Cited

U.S. PATENT DOCUMENTS

| 4,975,086 A | 12/1990 | Reichardt et al. |
| 5,259,777 A | 11/1993 | Schuder et al. |
| 5,807,124 A | 9/1998 | Bricaud et al. |

(Continued)

FOREIGN PATENT DOCUMENTS

| DE | 10027600 C1 | 11/2001 |
| DE | 69725940 T2 | 9/2004 |

(Continued)

*Primary Examiner* — Jean F Duverne
(74) *Attorney, Agent, or Firm* — Blank Rome LLP

(57) ABSTRACT

The invention relates to a switch spring arrangement in a card reader, comprising a contact carrier which is integrated into the card reader and includes a plurality of pockets, open on one side, for accommodating holding elements of a spring contact element, and a spring contact element that has two mounting arms to be secured in the contact carrier as well as a spring arm which can be actuated by a card and is placed between the mounting arms.

9 Claims, 3 Drawing Sheets

(56) References Cited

U.S. PATENT DOCUMENTS

| | | | | |
|---|---|---|---|---|
| 5,892,213 | A * | 4/1999 | Ito | G06K 19/07739 235/441 |
| 6,045,049 | A | 4/2000 | Nishimura | |
| 6,169,257 | B1 * | 1/2001 | Bricaud | G06K 7/0021 200/46 |
| 6,342,684 | B1 * | 1/2002 | Myojin | H01R 13/7033 200/52 R |
| 6,399,906 | B1 | 6/2002 | Sato et al. | |
| 6,431,893 | B1 * | 8/2002 | Chang | H01R 12/7094 439/188 |
| 7,396,245 | B2 * | 7/2008 | Huang | H01R 13/7033 439/188 |
| 7,682,174 | B2 * | 3/2010 | Chen | G06K 7/0021 439/188 |
| 7,686,633 | B2 * | 3/2010 | Yu | G06K 7/0047 439/188 |
| 8,016,618 | B2 * | 9/2011 | Takai | G06K 7/0021 439/630 |
| 9,589,750 | B2 * | 3/2017 | Bertsch | G06K 7/00 |

FOREIGN PATENT DOCUMENTS

| | | |
|---|---|---|
| DE | 102012005852 A1 | 9/2013 |
| EP | 0822507 A1 | 2/1998 |
| WO | 9104547 A2 | 4/1991 |

* cited by examiner

SWITCH SPRING ARRANGEMENT

RELATED APPLICATIONS

This application is a national stage application of International Application No. PCT/EP2017/060257, filed Apr. 28, 2017, which claims priority to German Patent Application No. 10 2016 108 319.4, filed May 4, 2016, the entire disclosures of which are hereby incorporated by reference.

The invention relates to a switch spring arrangement, in particular to a switch spring arrangement for card readers, in particular for chip cards and smart cards, such as, for example, a smart card connector in which different chip or smart cards can be inserted.

The documents U.S. Pat. No. 6,169,257 B1, U.S. Pat. No. 6,399,906 B1, and U.S. Pat. No. 5,807,124 A all concern switching contacts for a smart card reader.

A device for detecting a smart card, in which a switch spring arrangement is used, is moreover disclosed in U.S. Pat. No. 6,045,049 A.

Switch actuators or switch spring arrangements are usually used in card readers in order to detect so-called chip cards such as smart cards, microSD cards, TransFlash cards, or other types of card when they are pushed into the card reader, in which the switch spring arrangement is actuated by the card which is to be pushed in and a contact is either opened or closed.

Such arrangements are termed "normally open" or "normally closed" contacts, which means that, when no card is inserted, the card presence switch is in its open or closed state and, when the card is pushed in, the card presence switch is actuated by the card to assume the respective other state.

A problem with switch spring arrangements from the prior art lies in the fact that, as the dimensions of card readers become smaller and smaller, the switch spring arrangements and their switching paths are impaired during use, principally owing to tolerances, and the design has a significant effect on the costs of production and assembly.

The switch spring can thus, for example, break if a card reader has to undergo up to 500,000 switching cycles in the course of its switch actuations during its lifetime.

In particular in the case of payment terminals and card contacting devices in which several hundreds or thousands of reading operations take place every day, this results in a short lifetime and expensive repairs and maintenance work on the card reader devices are required.

A further problem is that, depending on the design and height of the card reader, there is insufficient spring travel or too little contact force of the contact partner of the switch spring arrangement.

Switch actuators with a design known from the prior art generally transfer the forces directly onto the switch such that relatively low contact forces occur in the case of large contact surfaces, as is the case, for example, when a contact dome contacts a complementary contact surface.

Moreover, when the spring arm moves, the contact point generally shifts from the initial contact point to the contact point in the final position when the movable spring arm has completely reached its final position. This gives rise to the problem that a precise contact point with a specific contact force can be achieved only with a great deal of complexity.

It should moreover be taken into account that on the market card thickness tolerances also need to be absorbed by the switch actuator. There are so-called minimum and maximum cards, i.e. the card thickness generally varies on the market depending on the manufacturer with different card thicknesses which lie within a predetermined tolerance range. The switch spring arrangement therefore needs to be designed such that such card thickness tolerances are absorbed.

The object of the present invention is to overcome the abovementioned disadvantages and provide a switch spring arrangement for actuating a switch, which has a high degree of operational reliability and offsets or minimizes the said disadvantages.

This object is achieved by a switch spring arrangement as claimed in claim 1.

Preferred embodiments of the invention are the subject of the dependent claims.

The basic concept of the present invention is to provide a specific design of a switch spring arrangement, in which the fastening arms and the contact carrier are configured such that easy assembly of the switch spring arrangement is ensured, whilst position tolerances are achieved by virtue of cross-over contacting by means of intersecting elongated contact domes between the contact partners, as a result of which although a defined contact point results in each case, it can lie along the anticlinal line of the elongated contact dome in each case at an adjacent (slightly displaced) position.

According to the invention, a switch spring arrangement in a card reader is therefore provided which has the following:

a. a contact carrier, integrated in a card reader, which has multiple pockets open on one side for receiving retaining elements of a spring contact element;

b. a spring contact element with two fastening arms for fastening in the contact carrier, and a spring arm which can be actuated by a card and is arranged between the fastening arms, c. wherein the spring arm forms an elongated contact dome, d. the two fastening arms comprise lateral projecting retaining elements which project into the pockets of the contact carrier for fastening the spring contact element on the contact carrier;

e. a complementary contact element which is designed with an elongated contact dome, f. wherein the two elongated contact domes are oriented relative to each other in the direction of their extension such that the contact domes intersect at a point of intersection and, when the contact domes contact each other, form a defined contact point.

A particularly advantageous design is where the elongated contact domes extend transversely relative to each other, preferably at an angle of approximately 90° relative to each other.

It is furthermore advantageous if the pockets are in each case designed so that they are open on an end side and also on a transverse side, such that the spring contact element can be pushed from the end side into the pockets with its laterally projecting retaining elements, which enables particularly easy and cost-effective assembly. In this respect, all of the relevant pockets are configured so that they are open in the same opening direction, such that assembly can take place by being pushed in in one direction.

In an advantageous embodiment of the invention, it is provided that contact surfaces, so that the undersides of the retaining elements can bear against them, are in each case formed by the contact carrier in the region of the pockets. The contact surfaces are moreover advantageously designed such that they also extend in regions outside the pockets such that these surfaces formed thereby can be used as an assembly plane for retaining elements of the spring contact element to bear against.

It is furthermore advantageous if each fastening arm has a first arm section in a first plane E1, and a second arm section adjoining the latter in a second plane E2, different from the first plane E1, which preferably corresponds to the assembly plane.

Within the sense of the present invention, planes should be understood as those planes which are spanned by the flat design of the underside of the respective elements lying within the plane, or by a plane within which these undersides all lie, which is explained in detail below with the aid of an exemplary embodiment.

In this respect, it is furthermore advantageous if the undersides of the retaining elements are situated within a common plane. It is furthermore advantageous if a retaining element of a fastening arm projects laterally from the second arm section within the same plane.

It is furthermore advantageous if a retaining element of a fastening arm projects laterally from the first arm section and extends over a step from the plane of one section into the lower (common) plane which is spanned by the underside of the other retaining elements.

In an advantageous embodiment of the invention, it is provided that the pockets in each case form a receiving gap between an upper contact carrier region and a lower contact carrier region which corresponds to the thickness of the retaining elements.

It is particularly advantageous if the direction of extension X of the elongated contact dome of the spring arm extends transversely to the direction of extension Y of the spring arm. As a result, a contact intersection point results at which a high contact force is achieved owing to the fact that the intersecting anticlinal lines of the contact domes bear against each other at a single point.

It is furthermore advantageous if the direction of extension X of the elongated contact dome of the complementary contact element extends approximately parallel to the direction of extension Y of the spring arm in the state where the spring arm contacts the complementary contact element, or alternatively along the projection of the spring arm into the plane in which the contact dome is arranged.

In a further advantageous embodiment of the invention, it is provided that the elongated contact domes are formed by being shaped out of material which is deformed, preferably by stamping, punching, or deep-drawing, and are preferably formed as a bead-like ridge on one side and at the same time as a groove-like depression on the opposite side of the spring arm or the complementary contact element. It is furthermore advantageous if the anticlinal line of the respective contact dome projects furthest from the adjacent regions of the contact dome.

Other advantages, objects, and details of the invention are apparent from the description of an exemplary embodiment with the aid of the drawings, in which.

The invention is explained in detail below with the aid of an exemplary embodiment with reference to FIGS. 1 to 3, wherein the same reference numerals refer to the same structural and/or functional features.

Figure 2:
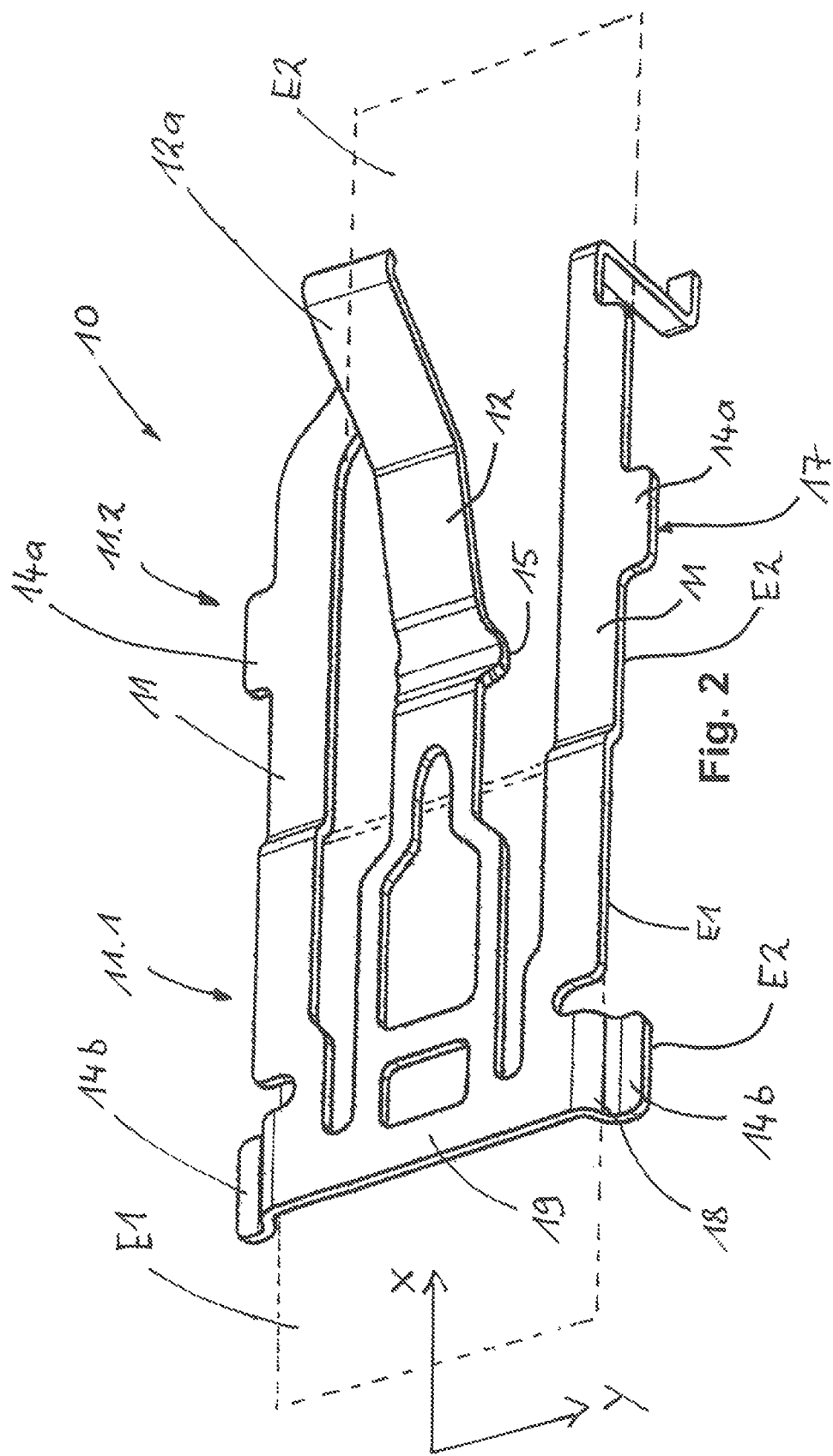
FIG. 2 shows a perspective view of a spring contact element according to the invention.
Figure 3:
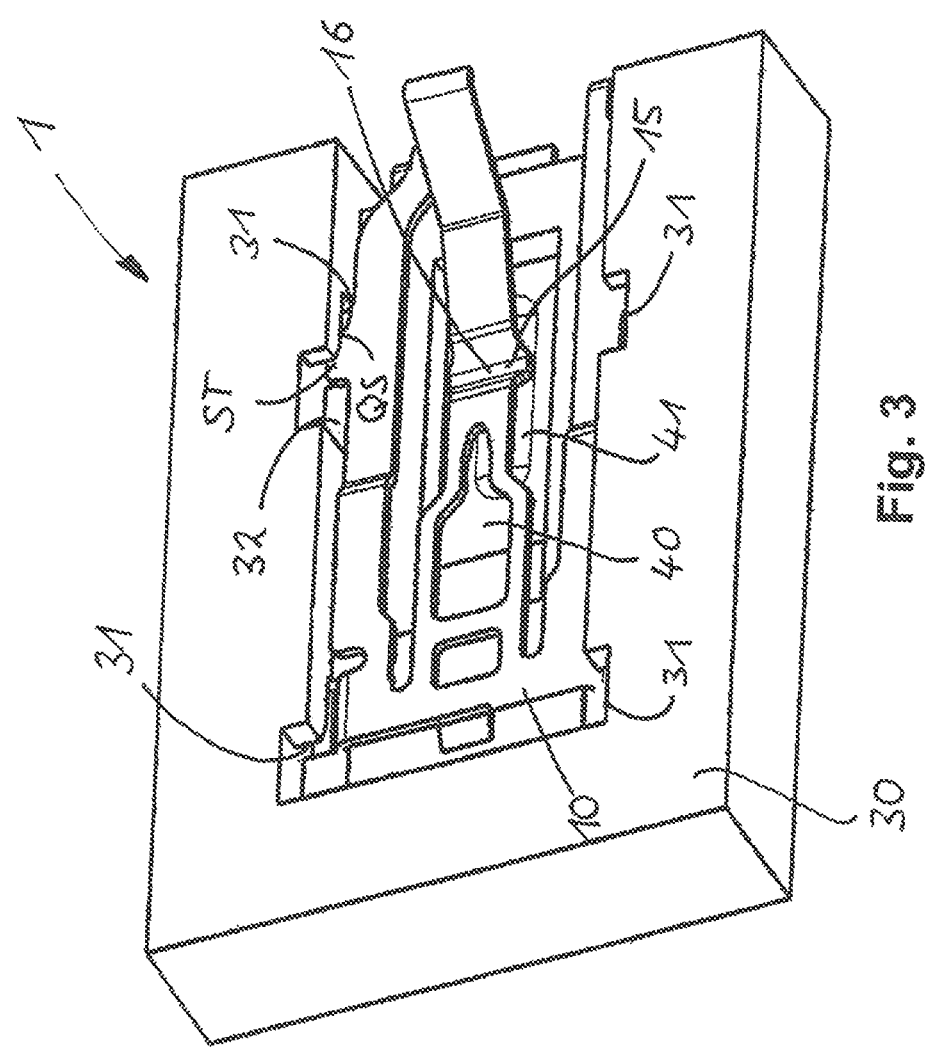
FIG. 3 shows a perspective view of a switch spring arrangement according to the invention.

An exemplary switch spring arrangement 1 in a card reader is shown in FIG. 3, with a contact carrier 30, integrated in the card reader, which has multiple pockets 31 open on one side for receiving the spring contact element 10 shown in FIGS. 2 and 3.

The spring contact element 10 has two fastening arms 11 for fastening in the contact carrier 30. The spring contact element 10 moreover has a spring arm 12, which can be actuated by a card, which is arranged between the fastening arms 11. The spring arm 12 is connected at one end to the fastening arms 11 via a common connecting web 19 of the spring contact element 10.

Each fastening arm 11 has a first arm section 11.1 in a first plane E1 and a second arm section 11.2, adjoining the latter, in a second plane E2 which is lower than the first plane E1 by the height of the step 11.3 which connects the two sections.

The undersides 17 of the retaining elements 14a, 14b lie within a common plane E2. One retaining element 14a (the rear one in FIG. 2) of each fastening arm 11 projects laterally from the second arm section 11.2 such that the underside lies within the plane E2. The second (front) retaining element 14b of each fastening arm 11, which projects laterally from the first arm section 11.1, extends with its underside from the plane E1 over a step 18 into the lower plane E2.

As can be seen in FIG. 2, the spring arm 12 has an elongated contact dome 15 which extends transversely to the direction of extension of the spring arm 12.

The two fastening arms 11 each comprise two lateral projecting retaining elements 14a, 14b which project into the pockets 31 of the contact carrier 30 for fastening the spring contact element 10 on the contact carrier 30.

Figure 1:
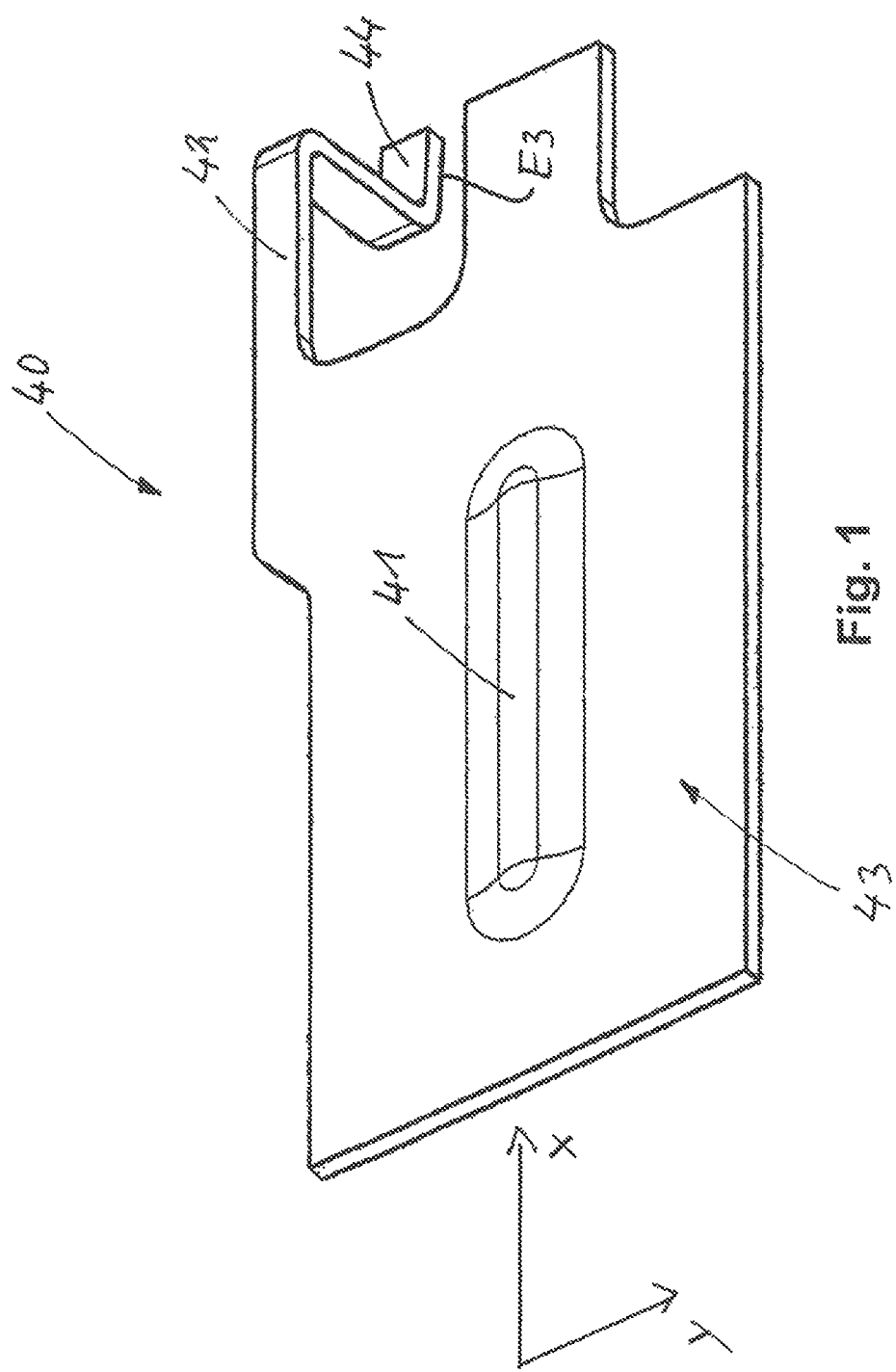
FIG. 1 shows a perspective view of a complementary contact element according to the invention.

The complementary contact element 40 is shown individually in FIG. 1 and in the assembled state in FIG. 3. The complementary contact element 40 is designed with an elongated contact dome 41, wherein the elongated contact dome 41 extends with an orientation which is transverse to the orientation of the contact dome 15 of the spring arm 12, and said domes intersect at a point of intersection 16 such that, when the contact domes 15, 41 contact each other, a defined contact point is in each case provided on the surfaces of the contact domes 15, 41.

The pockets 31 of the contact carrier are in each case designed so that they are open on their front end side ST and on their transverse side QS facing the spring contact element such that the spring contact element 10 can be pushed from the end side ST into the pockets 31 in the assembled position shown in FIG. 3 with its laterally projecting retaining elements 14a, 14b. Contact surfaces 32 are in each case formed in the region of the pockets 31 by the contact carrier 30 for the undersides 17 of the retaining elements 14a, 14b to bear against.

The pockets 31 each form a receiving gap, the respective height of which corresponds to the thickness of the respective retaining elements 14a and 14b.

The direction of extension X of the elongated contact dome 15 of the spring arm 12 extends, as can be seen in FIG. 3, transversely with respect to the direction of extension Y of the spring arm 12.

The direction of extension X of the elongated contact dome 15 of the complementary contact element 40 accordingly extends approximately parallel to the direction of extension Y of the spring arm 12, or in the projection of the direction of extension Y of the spring arm 12 into the plane of the complementary contact element 40.

A connecting tongue 42, which protrudes downward from the rectangular plate-like base plate 43 of the complementary contact element 40, is located on the complementary contact element 40 and is designed with a connecting end 44 which lies within a plane E3 spanned parallel to the planes E1 and E2.

The spring arm 12 has a contact zone 12*a* at its free end, wherein the contact zone 12*a* is situated in an (upward) angled region of the spring arm 12.

LIST OF REFERENCE NUMERALS 1 switch spring arrangement
10 spring contact element
11 fastening arm
11.1 first arm section
11.2 second arm section
11.3 step
12 spring arm
12*a* contact zone
14*a*, 14*b* retaining elements
15 contact dome
16 point of intersection
17 undersides
18 step
30 contact carrier
31 pockets
32 contact surface
40 complementary contact element
41 contact dome
42 connecting tongue
43 base plate
44 connecting end
E1 plane
E2 plane
E3 plane
ST end side
QS transverse side
X direction of extension
Y direction of extension

The invention claimed is:

1. A switch spring arrangement in a card reader comprising:
   a. a contact carrier, integrated in a card reader, which has multiple pockets open on one side;
   b. a spring contact element with fastening arms for fastening in the contact carrier, and a spring arm which can be actuated by a card and is arranged between the fastening arms, each fastening arm having a first arm section within a first plane and a second arm section adjoining the latter in a second plane, different from the first plane;
   c. wherein the spring arm forms an elongated contact dome;
   d. the fastening arms comprise lateral projecting retaining elements which project into the pockets of the contact carrier for fastening the spring contact element on the contact carrier, at least one of the retaining elements of at least one of the fastening arm projects laterally from the first arm section thereof and extends over a step from the plane into the plane; and
   e. a complementary contact element with an elongated contact dome,
   f. wherein the elongated contact domes are oriented relative to each other in the direction of their extension such that the contact domes intersect at a point of intersection and, when the contact domes contact each other, form a defined contact point.

2. The switch spring arrangement as claimed in claim 1, wherein the pockets are in each case designed so that they are open on an end side and also on a transverse side, such that the spring contact element can be pushed from the end side into the pockets with the laterally projecting retaining elements.

3. The switch spring arrangement as claimed in claim 1, wherein contact surfaces, such that undersides of the retaining elements can bear against them, are in each case formed by the contact carrier in the region of the pockets.

4. The switch spring arrangement as claimed in claim 1, wherein undersides of the retaining elements are situated within a common plane.

5. The switch spring arrangement as claimed in claim 1, wherein a retaining element of a fastening arm projects laterally from the second arm section within the plane.

6. The switch spring arrangement as claimed in claim 1, wherein the pockets in each case form a receiving gap which corresponds to the thickness of the retaining elements.

7. The switch spring arrangement as claimed in claim 1, wherein the direction of extension of the elongated contact dome of the spring arm extends transversely to the direction of extension of the spring arm.

8. The switch spring arrangement as claimed in claim 1, wherein the direction of extension of the elongated contact dome of the complementary contact element extends approximately parallel to the direction of extension of the spring arm.

9. The switch spring arrangement as claimed in claim 1, wherein the elongated contact domes are formed by being shaped out of material which is deformed, preferably by stamping, punching, or deep-drawing, and are formed as a bead-like ridge on one side and at the same time as a groove-like depression on the opposite side of the spring arm of the complementary contact element.

* * * * *